No. 791,168. PATENTED MAY 30, 1905.
C. STICKLE.
FEED WATER HEATER.
APPLICATION FILED DEC. 2, 1904.

Witnesses: Inventor,
Rudow Rummler, Cole Stickle,
Glen C. Stephens. By Rummler & Rummler,
Attorneys.

No. 791,168. Patented May 30, 1905.

UNITED STATES PATENT OFFICE.

COLE STICKLE, OF KANKAKEE, ILLINOIS.

FEED-WATER HEATER.

SPECIFICATION forming part of Letters Patent No. 791,168, dated May 30, 1905.

Application filed December 2, 1904. Serial No. 235,214.

*To all whom it may concern:*

Be it known that I, COLE STICKLE, a citizen of the United States of America, and a resident of Kankakee, county of Kankakee, and State of Illinois, have invented certain new and useful Improvements in Feed-Water Heaters and Purifiers, of which the following is a specification.

The main objects of my invention are to provide improved construction for feed-water heating and purifying devices; to provide in devices of this class improved means for utilizing exhaust-steam for heating feed-water, said means being particularly arranged to avoid as much as is practicable the admission of oil with the steam; to provide improved form of settling-pans for collecting earthy matter precipitated from the water, and to provide an improved form of filter for removing from the water such oil as enters the device with the steam. I accomplish these objects by the device shown in the accompanying drawings, in which—

Figure 2:
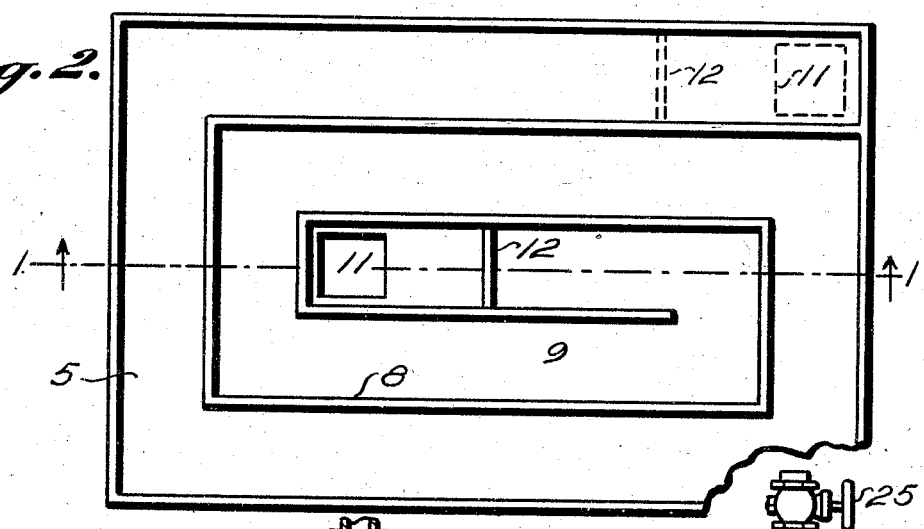
Figure 1:
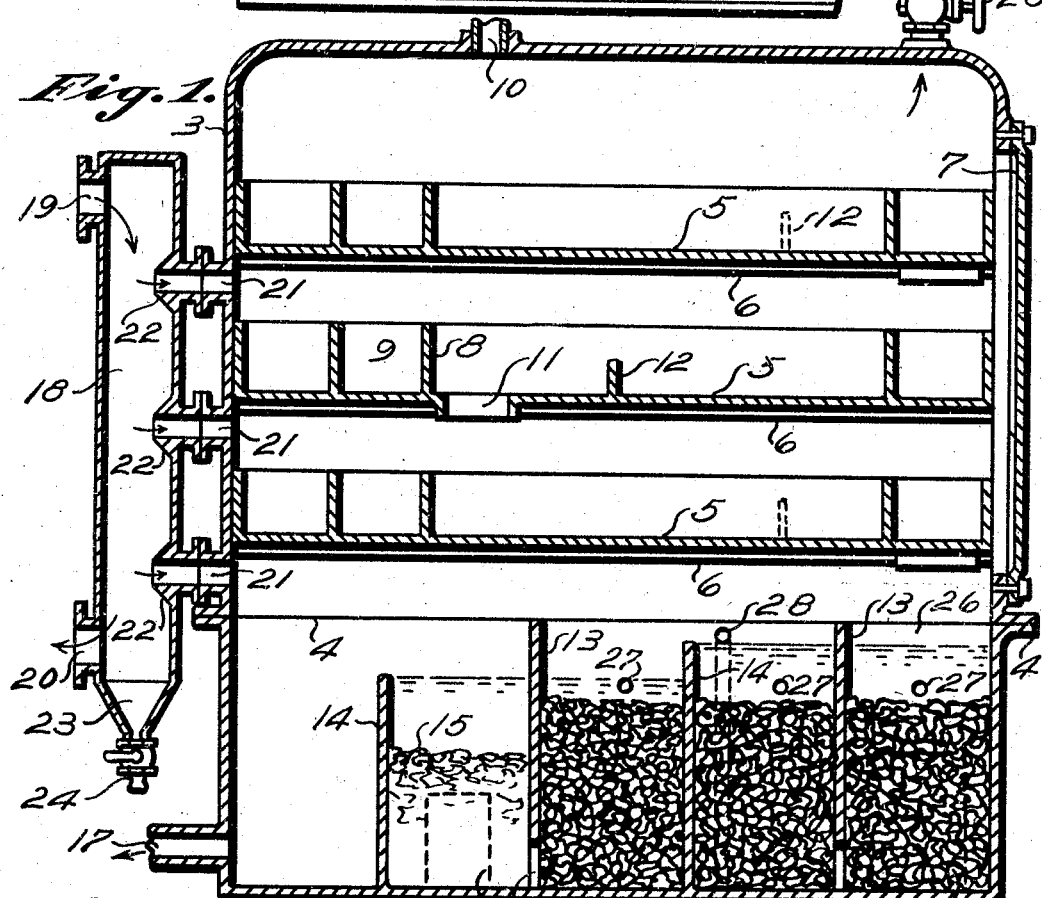

Figure 1 is a vertical section of a feed-water heater and purifier constructed according to my invention. Fig. 2 is a top plan of one of the pans, showing by dotted lines the varied arrangement of the alternate pans. The line 1 1 in Fig. 2 shows where the section indicated in Fig. 1 is taken.

In the construction shown the main receptacle or casing 3 is substantially rectangular in form and is, to permit of being easily cast, preferably formed of two parts connected by flanges 4. The upper part of the casing 3 is provided with a plurality of horizontally-disposed pans or partitions 5, which rest upon suitable supporting-flanges 6 and are removable through the door 7 in one side of the casing 3. The pans 5 are each subdivided by vertical partitions 8 to form a trough or passage 9, extending in a spiral course from the middle of the pan toward one of the outer corners thereof. The casing 3 is provided with a feed-water inlet 10, located directly above one end of the passage 9 of the uppermost pan 5. Each of the pans is provided with an overflow-aperture 11, and said apertures 11 are located alternately at opposite ends of the passages 9 of the pans—that is, in the upper pan the aperture 11 is located in the position indicated by dotted lines in Fig. 2, in the middle pan the aperture 11 is located as shown by full lines in Fig. 2, and in the lowest pan the location of the aperture is the same as in the uppermost pan. Each of the passages 9 has a transverse partition or dam 12 extending across the same near the aperture 11, the height of the dam being less than the height of the walls 8.

The lower part of the receptacle 3 is subdivided by a plurality of transverse vertical partitions 13 and 14, and the spaces between said partitions are filled with a filtering material, such as coke, to form a filter-bed 15. The partitions 13 have openings 16 near the bottom of the filter-beds, and the alternate partitions 14 are of less height than the partitions 13, so that water passing through the filter-beds will alternately flow beneath the partitions 13 and over the tops of the partitions 14. The partition 14 which is near the outlet is of less height than the other partition 14, so that there will be a head of water tending to cause continuous flow over each of the partitions. The space between the last partition 14 and the end wall of the receptacle is not filled with coke and communicates with the pipe 17, which conveys away the water after the same has passed through the apparatus. The partitions 14 serve as dams for maintaining a certain minimum depth of water over the filter-bed.

Secured at one side of the casing 3 is a header or compartment 18, through which exhaust-steam is caused to pass. The steam flows into the header 18 through the passages 19 and passes out at 20. The header 18 communicates with the receptacle 3 by means of a plurality of passages 21, which enter the receptacle at points between the shelves and serve to maintain a uniform temperature throughout the receptacle. Each of the passages 21 enters the header 18 through an inwardly-projecting conical boss 22. These bosses tend to prevent oil which is adhering to the walls of the header 18 from being drawn into the receptacle 3 by flow of steam through the passages 21. Oil accumulating on the walls of the header 18 will gradually flow toward the lower end 23, from which it may be drawn off by the petcock 24. The flow of steam through the receptacle 3 is controlled by means of the valve 25.

The receptacle is provided with suitable blow-offs 27, by means of which the water may be drawn off from above the filter-beds to get rid of any oil floating on the surface thereof. The relative depths of oil and water above the filter-beds are indicated by a water-gage 28. Hand-holes 29 are also provided for removing the filtering material from the spaces between the partitions. Only one of these is shown, the others being hidden by the filtering material.

The operation of the device shown is as follows: Assume that the header 18 is filled with exhaust-steam, preferably flowing downward between the passages 19 and 20. The feed-water on its way to the boilers passes through the receptacle 3, entering at the inlet-passage 10 and flowing into the upper pan, then along the passage 9, over the dam 12, and through the aperture 11 into the pan next below, and so on through each successive pan to the compartment 26. The water flows through the filtering-beds 15 and out through the passage 17. The space within the receptacle 3 which surrounds the pans is filled with steam entering from the header 18 and serving to heat the water passing along the pans and filter. The temperature to which the water in the pans is heated is controlled by the valve 25, which controls the escape of steam from the receptacle 3, and consequently also controls the admission of steam to said receptacle. The greater the flow of steam through the receptacle the greater would be the heating of the water. As exhaust-steam always contains more or less cylinder-oil, it is necessary to prevent such oil from being carried by the feed-water to the boilers. The steam flowing through the header 18 tends to deposit the oil on the interior walls of said header, and in order to prevent oil so deposited from being carried into the receptacle 3 I have provided the projections 22 at the entrance of the passages 21. These projections cause the oil on the walls of the header to flow past the passages without entering their mouths. The only oil which thus enters the receptacle is such as is held in suspension by the steam. Such oil as is deposited by the steam in the receptacle 3 is conveyed along by the water and remains floating on the surface of the water above the filter-beds. The oil is thus separated from the water and accumulates until it is withdrawn at the blow-off 27. The heating of the water by the steam while the water is slowly passing over the pans tends to precipitate the earthy impurities of the water, and the particles so precipitated are prevented from flowing from one pan to the next by the dams 12. Such particles of earthy matter as still remain in the water when the same leaves the last pan are removed therefrom when the water passes through the filter-beds 15. The partitions 13 and 14 cause the water to take a tortuous course through the filtering material, and thereby insure thorough filtration. The purified water is drawn off at the pipe 17 and is conducted thereby to the boilers.

It will be noticed that the arrangement of the water-passages on the pans is in the nature of an open coil. I am thus able to gain a high heating efficiency with as great economy in space as is possible with a closed-coil heater.

The main bulk of the exhaust-steam passes in its regular course through the header 18, and by adjusting the valve 25 the steam which is drawn into the receptacle 3 is just sufficient to give the desired temperature to the feed and is usually only a small fractional part of the entire exhaust. The only oil which must then be contended with is a correspondingly small fractional part of the total amount carried by the exhaust-steam.

It will be seen that numerous details of the construction shown may be altered without departing from the spirit of my invention.

What I claim as my invention, and desire to secure by Letters Patent, is—

1. In a device of the class described, the combination of a receptacle having therein a series of trays arranged one above the other and each arranged to overflow into the tray next below, a water-supply for feeding water to the uppermost tray, a discharge-outlet for withdrawing from the receptacle water that has passed along said series of trays, a steam pipe or header extending along one side of said receptacle, and having individual branch passages communicating with the different spaces between the trays of said receptacle and a valved outlet for controlling the escape of steam from the interior of said receptacle, substantially as described.

2. In a device of the class described the combination of a receptacle having a tortuous water-passage extending through the same, a steam pipe or header extending along one side of said receptacle, a branch passage of less diameter than said pipe connecting the same with the interior of said receptacle, the walls of said branch passage being extended a considerable distance inward of the inner walls of said pipe, and a valved outlet for controlling the escape of steam from the interior of said receptacle, substantially as described.

3. In a device of the class described, the combination of a receptacle having therein a series of trays arranged one above the other and each arranged to overflow into the tray next below, a water-supply for feeding water to the uppermost tray, a discharge-outlet for withdrawing from the receptacle water that has passed along said series of trays, a steam pipe or header extending vertically along one side of said receptacle and having a plurality of branch passages of less diameter than said pipe communicating with said receptacle at points between said trays, the walls of said branch passages being extended a considerable distance inward of the inner walls of said pipe, and a valved outlet for controlling the escape of steam from the interior of said receptacle, substantially as described.

4. In a device of the class described the combination of a receptacle having therein a plurality of horizontally-disposed trays arranged one above the other and each adapted to overflow into the next below, a filter in the lower part of said receptacle and adapted to receive the water discharged from said trays, a water-inlet for feeding water to the uppermost tray, an outlet for discharging water after the same has passed through said filter-bed, means for causing steam to circulate around the water passing through the receptacle, and means for insuring a certain minimum depth of water above the filter-bed for preventing oil from reaching the filter-bed, substantially as described.

5. In a device of the class described, the combination of a receptacle having therein a plurality of horizontally-disposed trays arranged one above the other and each adapted to overflow into the next below, a filter in the lower part of said receptacle and adapted to receive the water discharged from said trays, a water-inlet for feeding water to the uppermost tray, an outlet for discharging water after the same has passed through said filter-bed, means for causing steam to circulate around the water passing through the receptacle, means for insuring a certain minimum depth of water above the filter-bed for preventing oil from reaching the filter-bed, and a blow-off near said minimum water-level for withdrawing oil from the surface of the water above the filter-bed, substantially as described.

6. In a device of the class described, the combination of a receptacle having therein a plurality of horizontally-disposed trays arranged one above the other and each adapted to overflow into the next below, a filter-bed in the lower part of said receptacle and adapted to receive the water discharged from said trays, a plurality of partitions of greater height than the filter-bed extending upwardly from the bottom of the filter-bed, alternate partitions extending from a point near the bottom of the filter-bed to a certain height above the tops of the first partitions, said partitions being arranged to cause the water to follow a tortuous path through the filter-bed, a water-inlet for feeding water to the uppermost tray, an outlet for discharging water after the same has passed through said bed, and means for causing steam to circulate around the water passing through the receptacle, substantially as described.

7. In a device of the class described, the combination of a receptacle having therein a plurality of horizontally-disposed trays arranged one above the other and each adapted to overflow into the next below, a filter in the lower part of said receptacle and adapted to receive the water discharged from said trays, a water-inlet for feeding water to the uppermost tray, an outlet for discharging water after the same has passed through said filter-bed, means for causing steam to circulate around the water passing through the receptacle, a dam between said filter-bed and said outlet extending a considerable distance above said filter-bed to maintain a certain level of water above said filter-bed, a vertically-disposed partition between said dam and the inlet end of said filter-bed and extending from a point above the dam to a point below said certain water-level, said partition serving to prevent oil from flowing over said dam, and a blow-off near said minimum water-level for withdrawing oil from the surface of the water above the filter-bed, substantially as described.

Signed at Chicago this 29th day of November, 1904.

COLE STICKLE.

Witnesses:
E. A. RUMMLER,
GLEN C. STEPHENS.